United States Patent
Marques et al.

(10) Patent No.: US 8,966,895 B2
(45) Date of Patent: Mar. 3, 2015

(54) TURBOCHARGER CARTRIDGE, BYPASS, AND ENGINE CYLINDER HEAD ASSEMBLY

(75) Inventors: Manuel Marques, Richardmenil (FR); Jean-Jacques Laissus, Epinal (FR); Mani Palaniyappan, Zlin (CZ); Alain Lombard, Vosges (FR); Quentin Roberts, Vosges (FR); Johann Kurtzmann, Chavelot (FR); Aitor Herrera Celaya, Brno (CZ); Nicolas Serres, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 471 days.

(21) Appl. No.: 13/425,943

(22) Filed: Mar. 21, 2012

(65) Prior Publication Data

US 2013/0247565 A1  Sep. 26, 2013

(51) Int. Cl.
*F02D 23/00* (2006.01)
*F04D 19/00* (2006.01)
(Continued)

(52) U.S. Cl.
CPC ............... *F02B 37/00* (2013.01); *F02F 1/243* (2013.01); *F01D 25/28* (2013.01); *Y02T 10/144* (2013.01); *F05D 2220/40* (2013.01)
USPC ............. 60/602; 415/220; 415/230; 415/177; 417/407

(58) Field of Classification Search
CPC ...... F02B 37/12; F02B 37/183; F02B 37/186; F01D 25/24; F01D 17/105; F01D 25/04; F01D 11/005; F02C 6/12; F04D 27/0215; F02F 1/243; F05B 2220/307; Y02T 10/144
USPC .................. 60/602; 417/407, 409; 415/182.1, 415/212.1, 144–145, 110–111, 170.1, 200, 415/230, 177
See application file for complete search history.

(56) References Cited

U.S. PATENT DOCUMENTS 3,270,951 A * 9/1966 Reed ............................... 60/602
4,075,849 A * 2/1978 Richardson ..................... 60/602
(Continued)

FOREIGN PATENT DOCUMENTS

EP  2143922 A1 * 1/2010 ............... F02F 1/24
GB  2478008 A  * 8/2011 ............... F02F 1/24
(Continued)

OTHER PUBLICATIONS

U.S. Appl. No. 61/422,485; dated Dec. 13, 2010.
(Continued)

*Primary Examiner* — Thai Ba Trieu
(74) *Attorney, Agent, or Firm* — John C. James

(57) ABSTRACT

A turbocharger assembly includes a center housing rotating assembly, which comprises a center housing, bearings housed in the center housing, a shaft rotatably supported in the bearings, and compressor and turbine wheels affixed to opposite ends of the shaft; an engine cylinder head and a housing member formed together as a one-piece integral structure, wherein the housing member defines a compressor volute that receives compressed air from the compressor wheel, a turbine volute for receiving exhaust gas from the engine, a turbine nozzle for directing exhaust gas from the turbine volute into the turbine wheel, and a turbine contour; a compressor contour plug that defines an axial inlet for the compressor and a compressor contour; and a wastegate unit operable for allowing exhaust gas to bypass the turbine wheel when the wastegate unit is open and preventing exhaust gas from bypassing the turbine wheel when the wastegate unit is closed.

11 Claims, 12 Drawing Sheets

(51) Int. Cl.
*F04D 29/10* (2006.01)
*F01D 25/08* (2006.01)
*F04B 17/00* (2006.01)
*F02B 37/00* (2006.01)
*F02F 1/24* (2006.01)
*F01D 25/28* (2006.01)

(56) References Cited

U.S. PATENT DOCUMENTS

| | | | |
|---|---|---|---|
| 4,463,564 A * | 8/1984 | McInerney | 60/602 |
| 4,613,288 A * | 9/1986 | McInerney | 417/407 |
| 4,630,445 A * | 12/1986 | Parker | 60/602 |
| 4,655,040 A * | 4/1987 | Parker | 60/602 |
| 4,655,043 A * | 4/1987 | McInerney | 60/602 |
| 4,656,834 A * | 4/1987 | Elpern | 60/602 |
| 4,721,441 A | 1/1988 | Miyashita et al. | |
| 4,815,184 A | 3/1989 | Johnston et al. | |
| 5,857,337 A * | 1/1999 | Kawasaki | 60/602 |
| 6,193,463 B1 | 2/2001 | Adeff et al. | |
| 7,089,737 B2 | 8/2006 | Claus | |
| 7,428,813 B2 * | 9/2008 | Finger et al. | 60/602 |
| 7,637,106 B2 * | 12/2009 | Hertweck et al. | 60/602 |
| 8,062,006 B2 | 11/2011 | Hummel et al. | |
| 8,092,162 B2 * | 1/2012 | Masson et al. | 415/177 |
| 2005/0069427 A1 | 3/2005 | Roemuss et al. | |
| 2009/0031722 A1 | 2/2009 | An et al. | |
| 2009/0077966 A1 | 3/2009 | Lombard et al. | |
| 2009/0136368 A1 | 5/2009 | Arnold et al. | |
| 2009/0226307 A1 * | 9/2009 | Masson et al. | 415/177 |
| 2010/0180592 A1 | 7/2010 | Williams et al. | |
| 2010/0322106 A1 | 12/2010 | Qiang | |
| 2011/0011085 A1 | 1/2011 | Garrett et al. | |
| 2011/0103936 A1 | 5/2011 | Lombard | |
| 2011/0171017 A1 | 7/2011 | Lingenauber et al. | |
| 2011/0173972 A1 | 7/2011 | Wade et al. | |
| 2011/0200422 A1 | 8/2011 | Gutknecht | |
| 2011/0268559 A1 * | 11/2011 | Lombard et al. | 415/145 |
| 2012/0011845 A1 | 1/2012 | Williams et al. | |
| 2012/0047887 A1 * | 3/2012 | Petitjean et al. | 60/602 |
| 2012/0148386 A1 | 6/2012 | Lombard | |
| 2012/0192557 A1 * | 8/2012 | Johnson et al. | 60/599 |
| 2012/0321455 A1 * | 12/2012 | Boening et al. | 415/208.1 |
| 2013/0071243 A1 * | 3/2013 | Kocher et al. | 415/230 |
| 2013/0149126 A1 * | 6/2013 | Herrera Celaya et al. | 415/200 |
| 2013/0195620 A1 * | 8/2013 | Joergl et al. | 415/116 |
| 2013/0202431 A1 * | 8/2013 | Heidingsfelder et al. | 415/220 |
| 2013/0223995 A1 | 8/2013 | Lombard et al. | |
| 2013/0247566 A1 * | 9/2013 | Lombard et al. | 60/605.1 |

FOREIGN PATENT DOCUMENTS

| | | | | |
|---|---|---|---|---|
| GB | 2494145 A * | 3/2013 | | F02F 1/24 |
| JP | 57-052624 A | 3/1982 | | |
| JP | 2002-303145 A | 10/2002 | | |
| JP | 2006-194227 A | 7/2006 | | |
| JP | 2006249945 A * | 9/2006 | | F02F 1/24 |
| JP | 2006-266244 A | 10/2006 | | |
| JP | 2010-038091 A | 2/2010 | | |
| JP | 2010-151283 A | 6/2010 | | |
| WO | WO 2010/085494 A1 | 7/2010 | | |
| WO | WO 2011/154874 A2 | 12/2011 | | |
| WO | WO 2012076416 A1 * | 6/2012 | | F02B 25/04 |

OTHER PUBLICATIONS

International Search Report and Written Opinion for Application No. PCT/US2013/029770, dated Jun. 17, 2013.
International Search Report and Written Opinion for Application No. PCT/US2013/029319, dated Jun. 13, 2013.
International Search Report and Written Opinion for Application No. PCT/US2013/029537, dated Jun. 14, 2013.
Office Action from U.S. Appl. No. 13/425,891, dated Sep. 4, 2014.

* cited by examiner

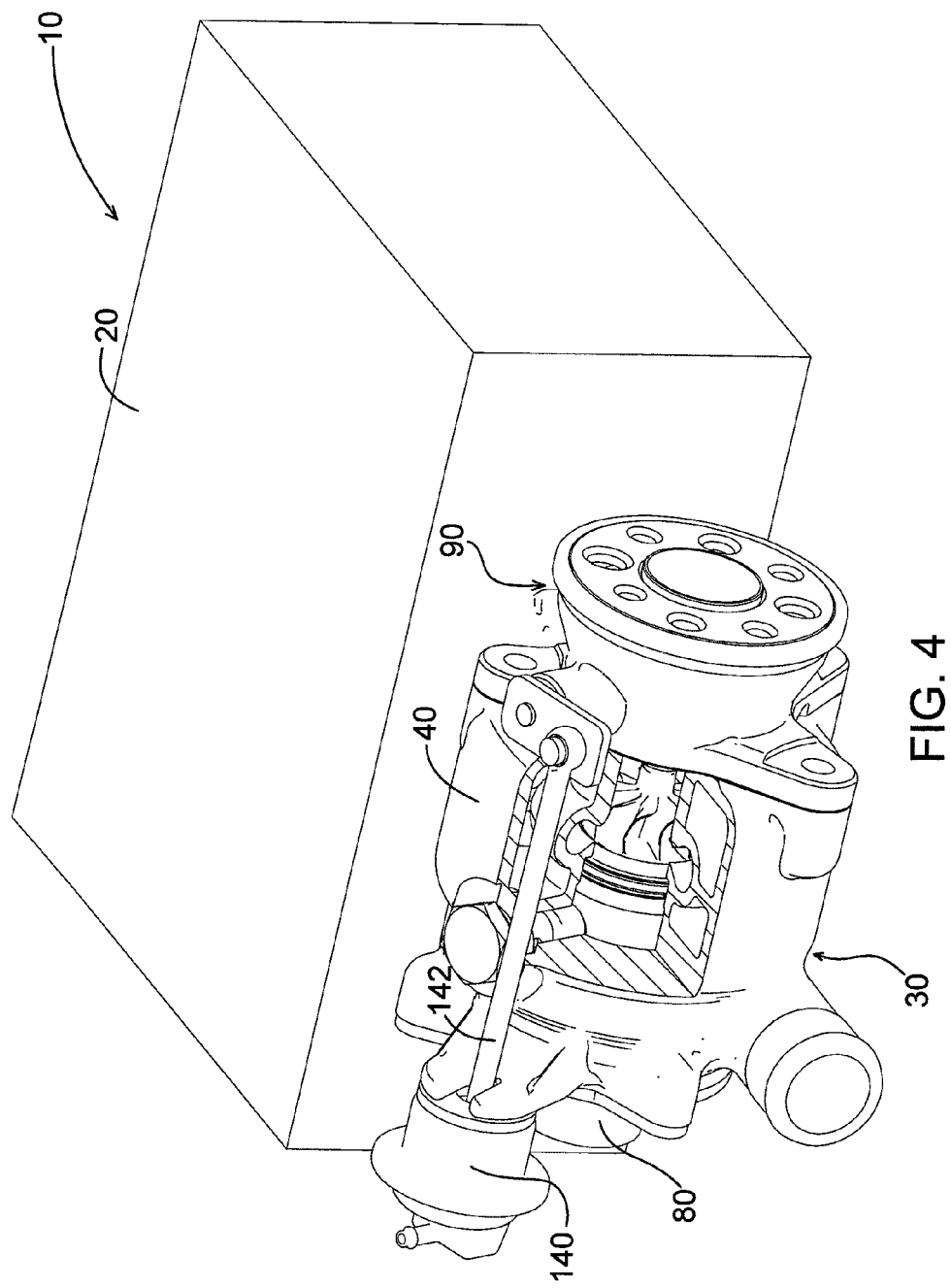

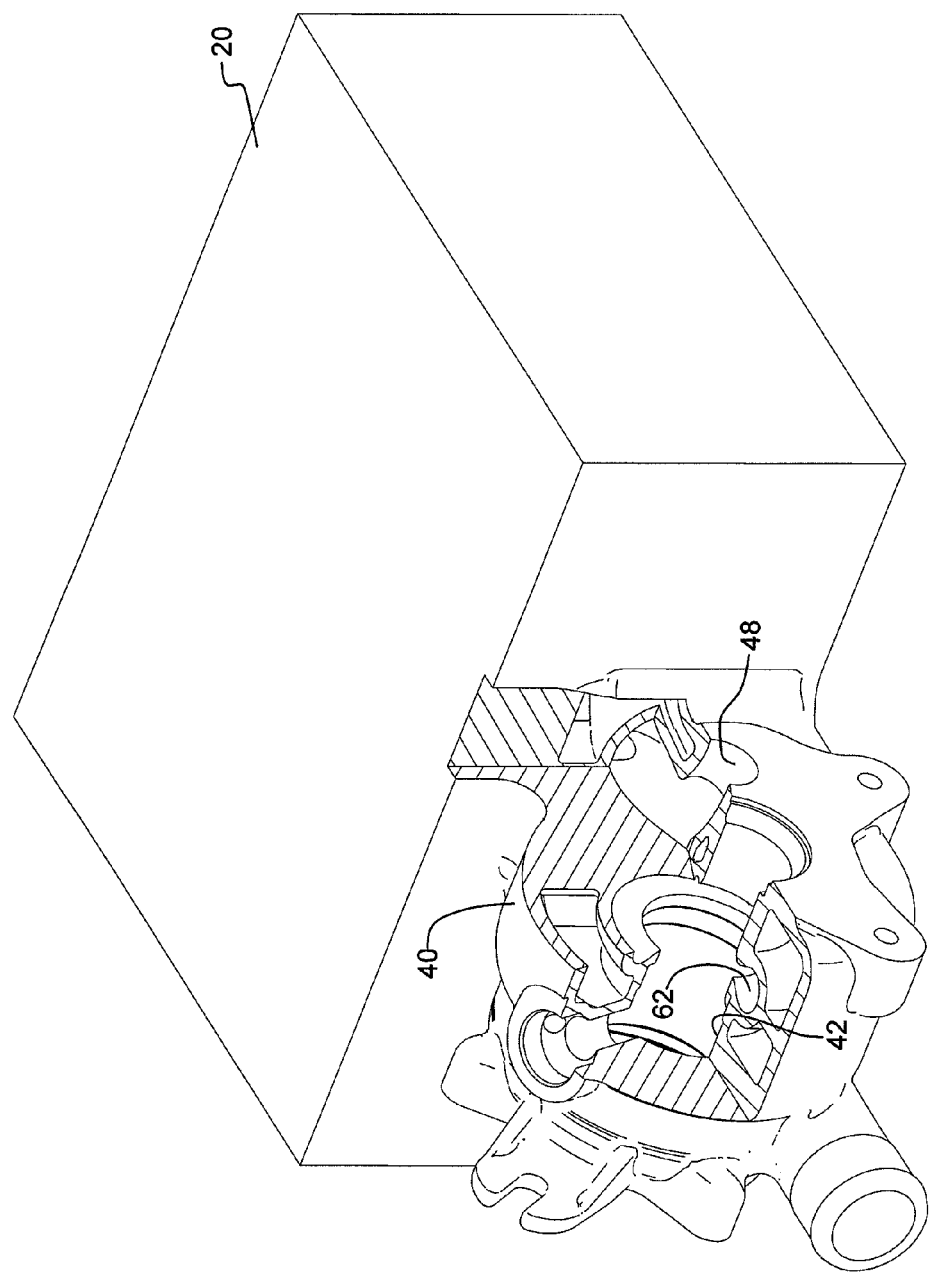

TURBOCHARGER CARTRIDGE, BYPASS, AND ENGINE CYLINDER HEAD ASSEMBLY

BACKGROUND OF THE INVENTION

The present disclosure relates to exhaust gas-driven turbochargers, and particularly relates to turbocharger and engine cylinder head assemblies.

Increasingly, gasoline engines are being produced in the form of turbocharged engines. It would be desirable to provide a turbocharger that can be produced at lower cost without sacrificing performance. Production cost for a turbocharger for a gasoline engine is largely driven by the cost of the turbine housing.

BRIEF SUMMARY OF THE DISCLOSURE

The present disclosure addresses issues such as the one noted above.

In accordance with one embodiment described herein, a turbocharger cartridge, bypass, and engine cylinder head assembly is provided that includes: (1) a center housing rotating assembly, which comprises a center housing, bearings housed in the center housing, a shaft rotatably supported in the bearings, and compressor and turbine wheels affixed to opposite ends of the shaft; (2) an engine cylinder head and a housing member formed together as a one-piece integral structure, wherein the housing member defines a compressor volute that receives compressed air from the compressor wheel, a turbine volute for receiving exhaust gas from the engine, a turbine nozzle for directing exhaust gas from the turbine volute into the turbine wheel, and a turbine contour (i.e., a wall that lies closely adjacent the radially outer tips of the blades of the turbine wheel in the vicinity and downstream of a throat of the blade passages); (3) a compressor contour plug that defines an axial inlet for the compressor and a compressor contour (i.e., a wall that lies closely adjacent the radially outer tips of the blades of the compressor wheel); and (4) a wastegate unit operable for allowing exhaust gas to bypass the turbine wheel when the wastegate unit is open and preventing exhaust gas from bypassing the turbine wheel when the wastegate unit is closed.

The turbocharger cartridge is configured to slide axially, turbine wheel first, into a receptacle defined in the housing member of the engine cylinder head. The compressor contour plug is then affixed to the housing member. The wastegate unit is affixed to the housing member adjacent the turbine. A wastegate passage defined in the housing member of the engine cylinder head mates with a corresponding wastegate passage defined in the wastegate unit.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 4 is a view similar to that of FIG. 1, wherein the housing member of the engine cylinder head has been partly sectioned;

FIG. 4A is a perspective view of the engine cylinder head alone, partly sectioned to show internal details;

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
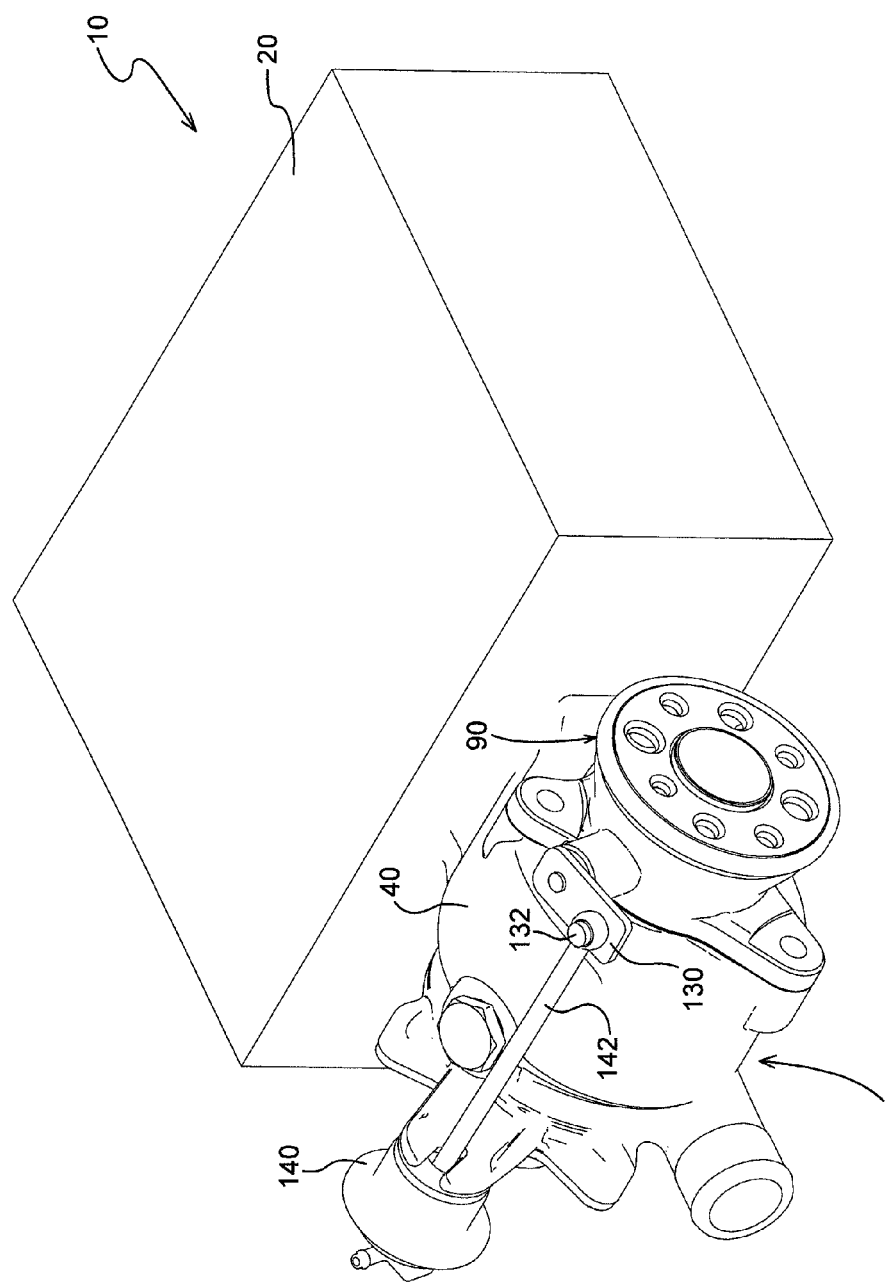
FIG. 1 is a perspective view of a turbocharger cartridge, bypass, and engine cylinder head assembly in accordance with an embodiment of the present invention.
Figure 2:
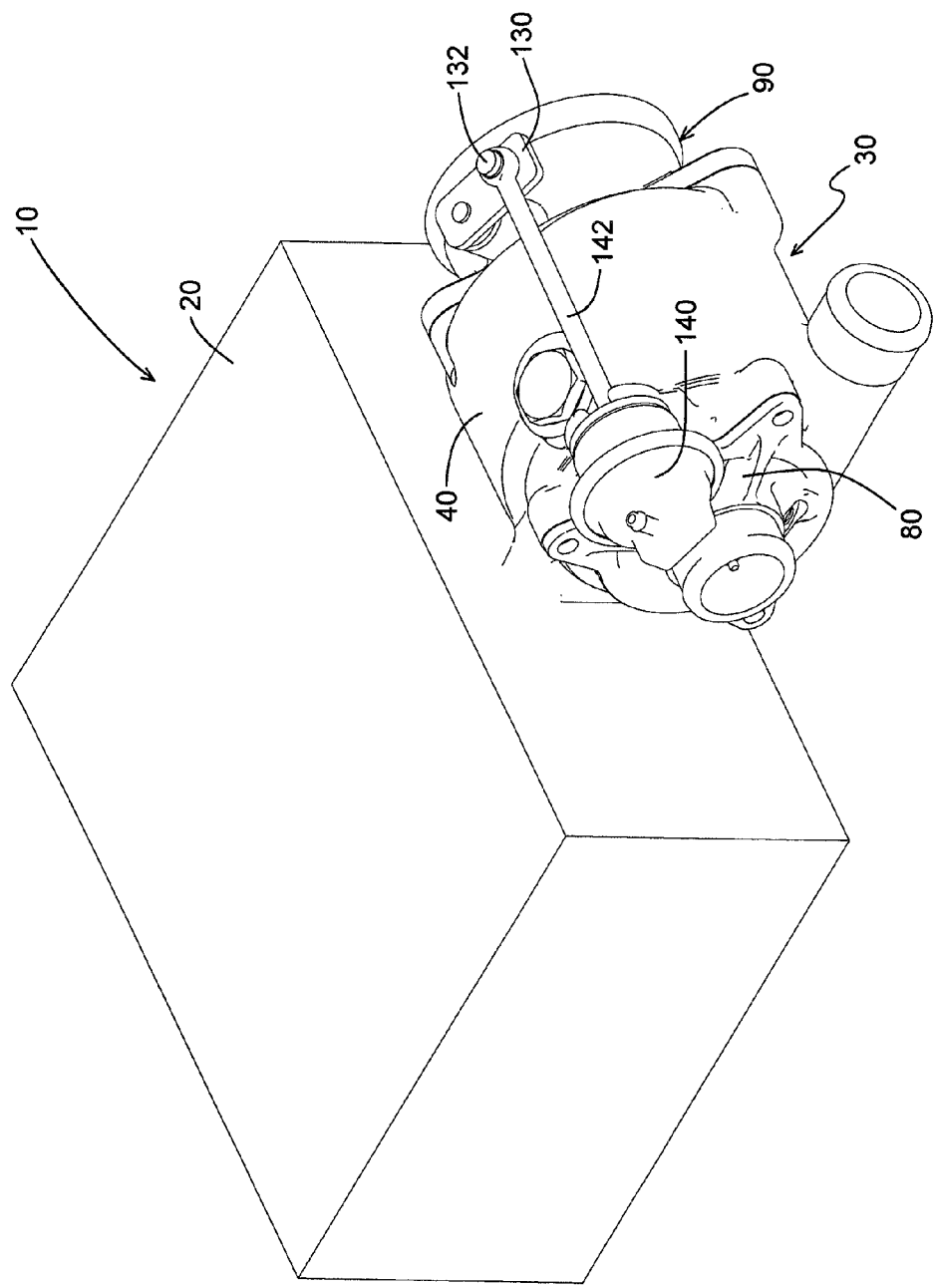
FIG. 2 is a further perspective view of the turbocharger cartridge, bypass, and engine cylinder head assembly of FIG. 1.
Figure 3:
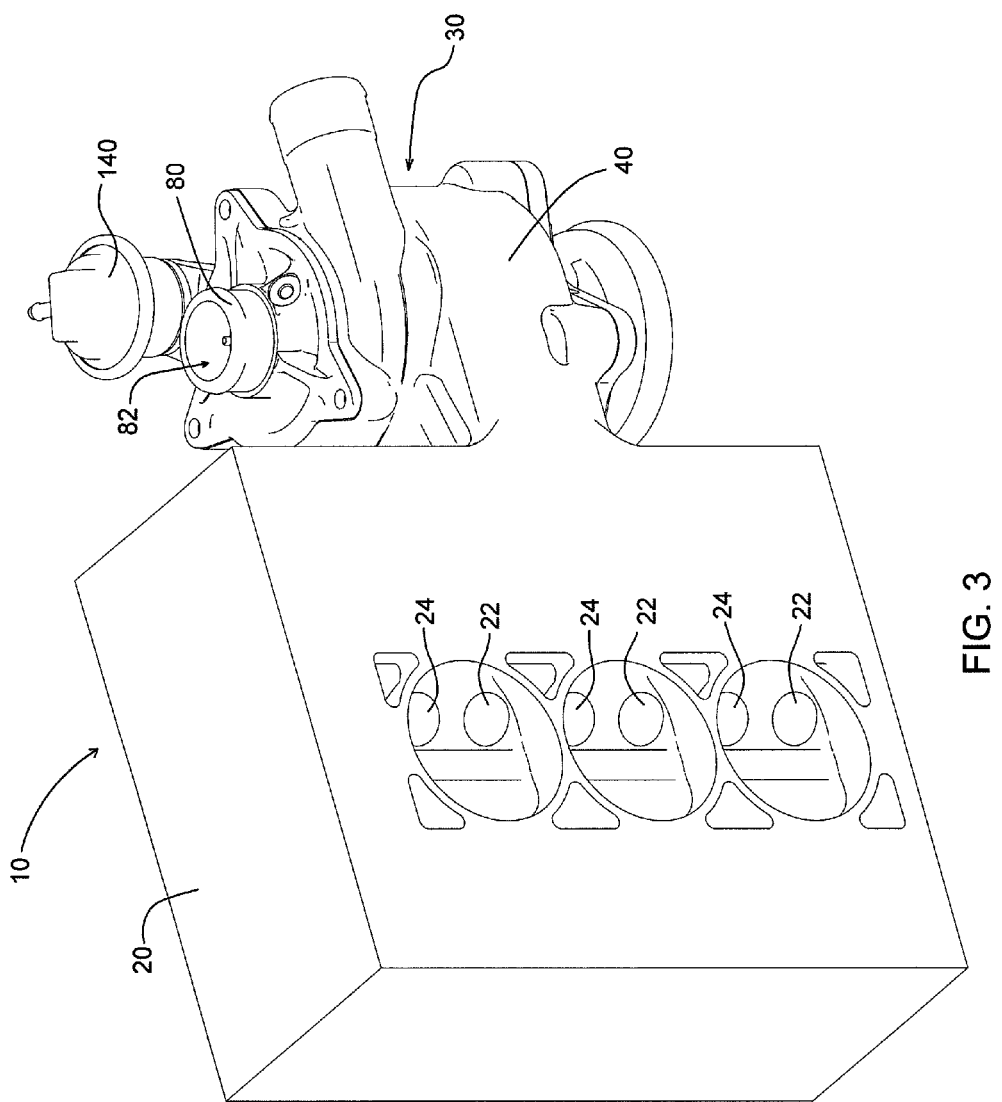
FIG. 3 is a still further perspective view of the turbocharger cartridge, bypass, and engine cylinder head assembly of FIG. 1.
Figure 5:
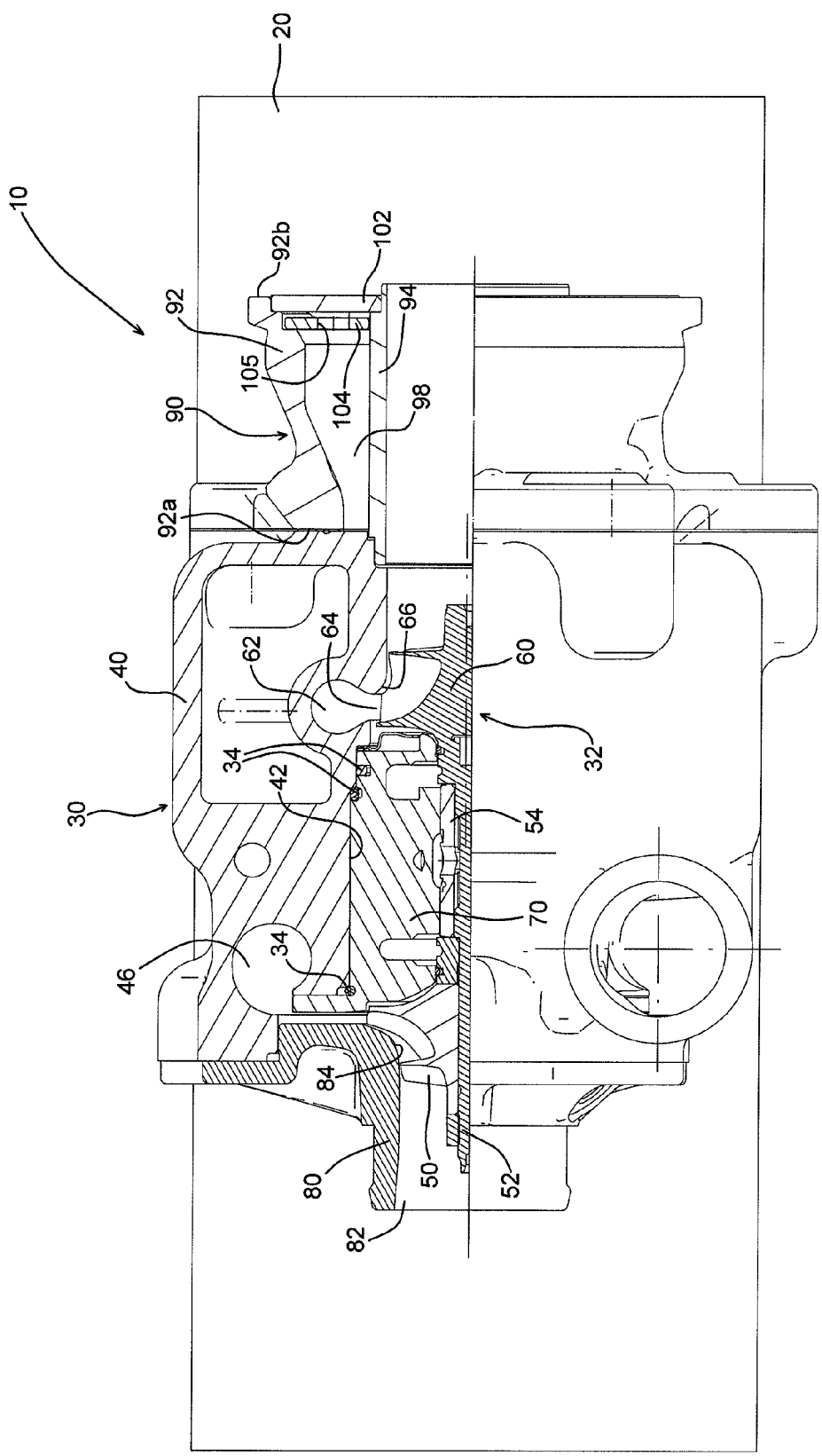
FIG. 5 is a front view of the turbocharger cartridge, bypass, and engine cylinder head assembly of FIG. 1, but partly sectioned and with the linkage between the actuator and the wastegate unit removed.
Figure 6:
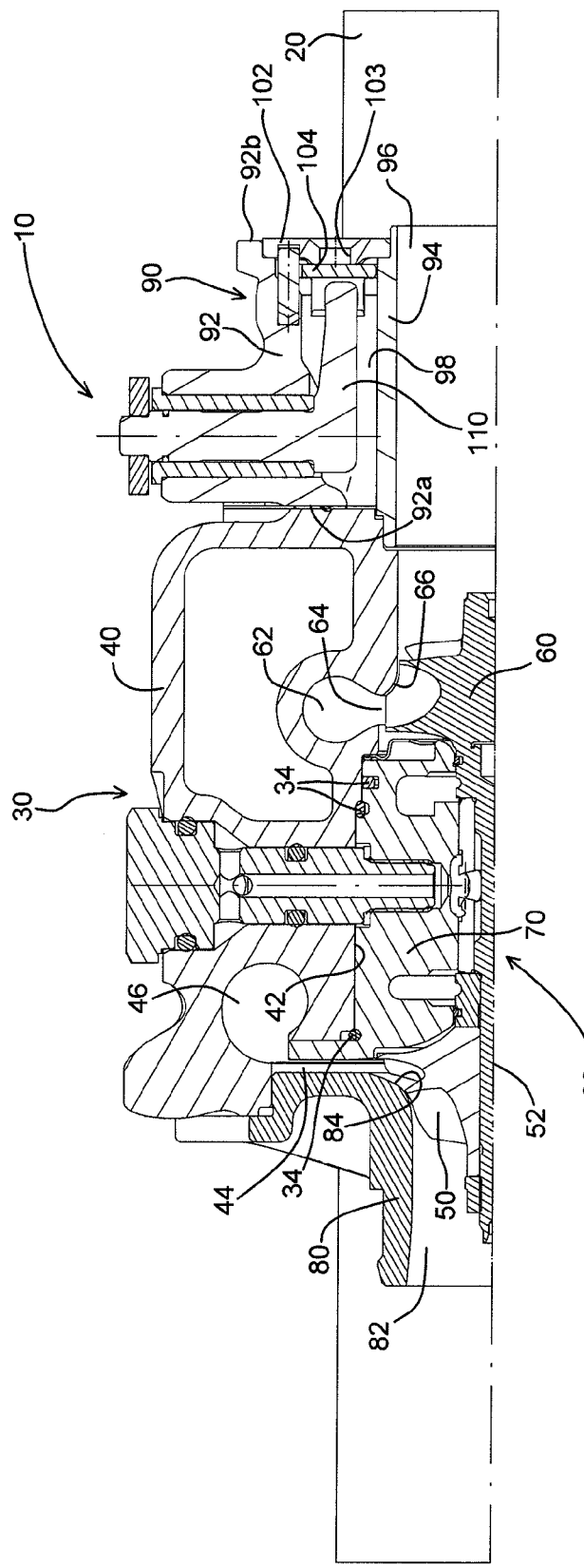
FIG. 6 is a cross-sectional view of the turbocharger cartridge, bypass, and engine cylinder head assembly of FIG. 1.
Figure 7:
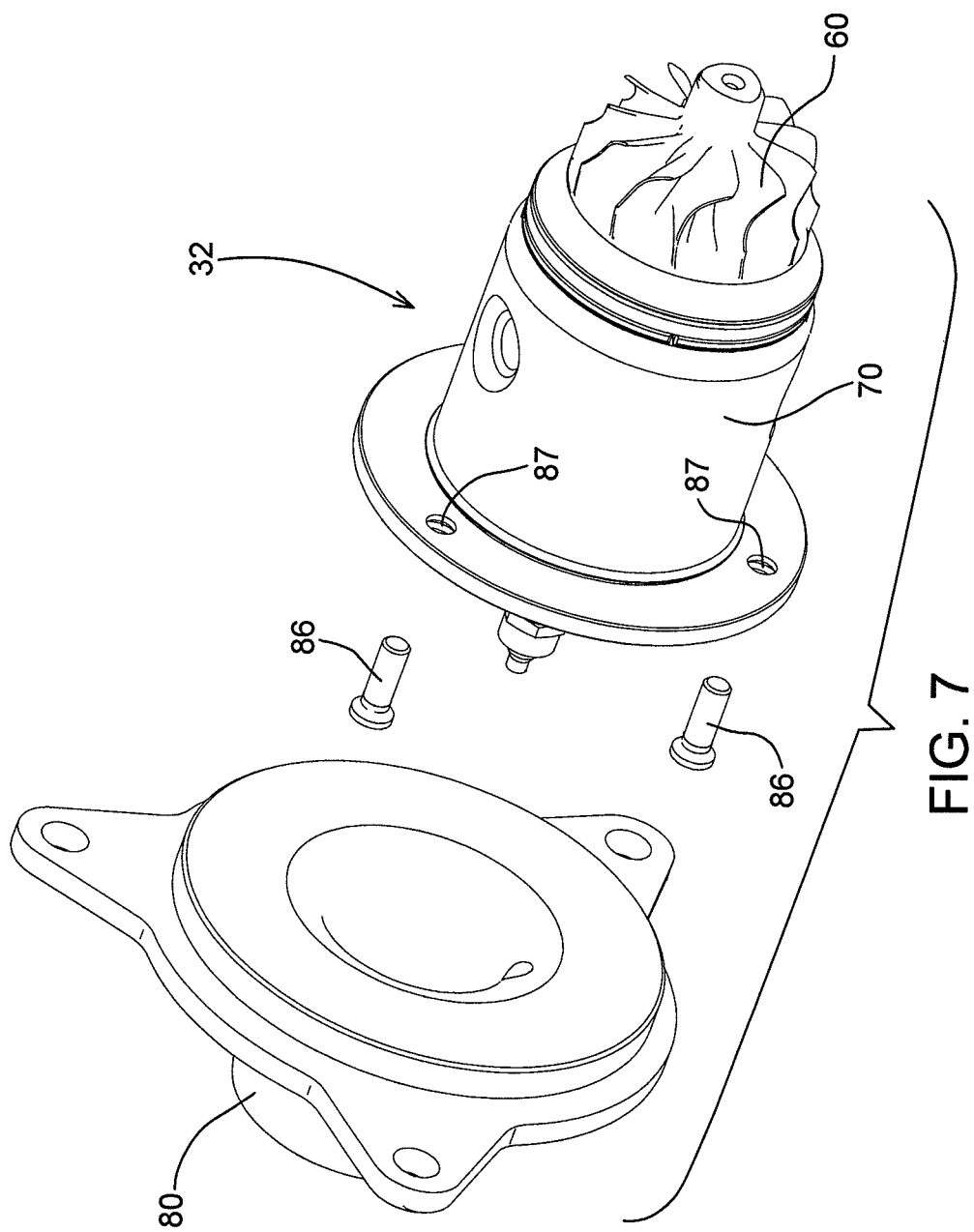
FIG. 7 is an exploded view of the turbocharger cartridge and compressor contour plug.

A turbocharger cartridge, bypass, and engine cylinder head assembly 10 in accordance with one embodiment of the invention is depicted in FIGS. 1-6, and the turbocharger cartridge is shown in isolation in FIG. 7. With reference initially to FIGS. 1-3, the assembly 10 comprises an engine cylinder head 20 (illustrated only schematically) on which a turbocharger 30 is mounted. The engine cylinder head 20 comprises a casting that is configured to sit atop the engine block, above the engine cylinders. The head 20 typically houses components of the intake and exhaust valves for the cylinders and defines intake and exhaust passages through which intake air is delivered to the cylinders and exhaust gases are routed away from the cylinders, respectively. With reference to FIG. 3, for example, the head 20 is illustrated as being configured for a 3-cylinder engine, although the invention is applicable to engines of any number of cylinders. For each cylinder, the head defines at least one intake passage 22 and at least one exhaust passage 24. The head is configured to route the exhaust gases produced in the engine cylinders through the exhaust passages 24 into an exhaust manifold (not shown) that feeds exhaust gases to the turbine of the turbocharger.

The cylinder head 20 defines a housing member 40 as an integral part thereof. The head proper and the housing member collectively can be, for example, a one-piece casting. As further described below, the housing member 40 is configured to define a number of features that would conventionally be defined by separate housing members of the turbocharger 30.

With reference to FIGS. 5 through 7, the turbocharger 30 includes a "cartridge" 32, also referred to herein as a center housing rotating assembly (CHRA). The CHRA 32 comprises a compressor wheel 50 affixed to one end of a shaft 52 and a turbine wheel 60 affixed to the opposite end of the shaft 52, bearings 54 that rotatably support the shaft 52, and a center housing 70 that houses the bearings 54 and defines oil passages for supplying oil to and scavenging oil from the bearings, and (optionally) water passages for circulating coolant through the center housing.

In accordance with the invention, the housing member 40 of the cylinder head 20 defines a receptacle 42 that receives the CHRA 32. The receptacle 42 is a stepped, generally cylindrical bore extending axially through the housing member 40. The receptacle is configured to allow the CHRA 32 to be slid axially into the receptacle, turbine wheel first (i.e., to the right in FIGS. 5 and 6). Thus, the receptacle 42 for example can have various portions of differing inside diameters, with steps transitioning between adjacent portions of different diameters. The steps are compressor-side-facing, i.e., each step faces axially toward the compressor side of the CHRA (to the left in FIGS. 5 and 6), and thus the receptacle becomes progressively smaller in diameter in the direction from the compressor toward the turbine. The center housing 70 of the CHRA 32 is correspondingly stepped to substantially match the stepped configuration of the receptacle 42. There are seals (e.g., O-rings) 34 between the center housing 70 and the receptacle 42 for sealing the interface therebetween and to separate or isolate the oil passages and the water passages (if present) in the center housing.

As noted, the housing member 40 defines features that in conventional turbochargers would be defined by separate turbine and compressor housings. Specifically, the housing member 40 defines at least a compressor volute 46 that receives compressed air from the compressor wheel 50, a turbine volute 62 for receiving exhaust gas from the exhaust gas manifold of the engine, a turbine nozzle 64 for directing exhaust gas from the turbine volute into the turbine wheel 60, and a turbine contour 66 that generally follows the outer contour of the blades of the turbine wheel 60.

The turbocharger cartridge, bypass, and engine cylinder head assembly 10 further comprises a compressor contour plug 80 that defines an axial inlet 82 for the compressor and also defines a compressor contour 84 that generally follows the outer contour of the blades of the compressor wheel 50. The compressor contour plug 80 is affixed (e.g., by threaded fasteners) to the housing member 40. A portion of the plug 80 forms one wall of a compressor diffuser 44 through which air compressed by the compressor wheel 50 passes radially outwardly and into the compressor volute 46. An opposite wall of the diffuser 44 is formed by the center housing 70 of the CHRA 32. The center housing 70 defines a number of spaced holes 87 for receiving bolts 86 (FIG. 7) to fasten the center housing to the housing member 40 of the engine cylinder head. For example, there can be three such holes 87 and three bolts 86 (only two of which are visible in FIG. 7).

The last major component of the turbocharger cartridge, bypass, and engine cylinder head assembly 10 is a wastegate or turbine bypass unit 90. The wastegate unit is operable to allow some or substantially all of the exhaust gases to bypass the turbine wheel 60 under certain operating conditions. In the illustrated embodiment, the wastegate unit 90 is a rotary turbine bypass (RTB) unit generally as described in Applicant's co-pending U.S. application Ser. No. 12/611,816 filed on Nov. 3, 2009, application Ser. No. 12/771,434 filed on Apr. 30, 2010, application Ser. No. 12/966,343 filed Dec. 13, 2010, and Application Ser. No. 61/422,485 filed Dec. 13, 2010, the entire disclosures of said applications being hereby incorporated herein by reference.

With reference to FIGS. 5 and 6, the RTB unit 90 includes a valve housing assembly comprising a main housing 92 and a housing insert 94. The main housing 92 defines a passage extending through the main housing from a first side 92a to a second side 92b thereof. The housing insert 94 comprises a generally tubular member that is disposed in the passage of the main housing such that the interior of the housing insert 94 defines a central flow passage 96, and an annular space between the outer surface of the housing insert 94 and an inner surface of the main housing 92 defines an annular flow passage (also referred to herein as a wastegate passage) 98 that surrounds the central flow passage 96.

The RTB unit 90 further comprises a stationary valve seat 102 and a rotary valve member 104 in abutting engagement with the valve seat. The valve seat 102 and valve member 104 are arranged in the annular space between the main housing 92 and the housing insert 94. The valve member 104 is prevented from moving axially upstream by a shoulder defined by the main housing 92, although during operation pressure of the exhaust gas urges the valve member 104 in the downstream direction. The valve member 104 is not constrained by the main housing but is free to rotate about its axis and to move axially against the valve seat 102. The valve seat 102 is prevented from moving axially, radially, or rotationally. The valve seat 102 is a generally flat ring-shaped or annular member having a plurality of orifices 103 (FIG. 6) circumferentially spaced apart about a circumference of the valve seat, the orifices 103 extending generally axially between the upstream and downstream faces of the valve seat. The orifices 103 can be uniformly or non-uniformly spaced about the circumference of the valve seat.

The rotary valve member 104 is a generally flat ring-shaped or annular member having a plurality of orifices 105 (FIG. 5) circumferentially spaced apart about a circumference of the valve member, the orifices 105 extending generally axially between the upstream and downstream faces of the valve member. The orifices 105 can be uniformly or non-uniformly spaced about the circumference of the valve member. The number and spacing of the orifices 105 in the valve member can be the same as the number and spacing of the orifices 103 in the valve seat. However, non-uniform spacing of the orifices 105 is also possible and can be advantageous in some circumstances; furthermore, the spacings of the orifices 103 and 105 do not have to be the same, and in some cases it can be advantageous for the spacings to be different. The main housing 92 and the housing insert 94 both define substantially circular bearing surfaces for the outer and inner edges of the rotary valve member 104 and there are clearances therebetween, so that the valve member 104 can be rotated in one direction or the opposite direction about its central longitudinal axis in order to vary a degree of alignment between the valve member orifices 105 and the valve seat orifices 103.

The valve member 104 is engaged by the distal end of an L-shaped drive arm 110 (FIG. 6) a portion of which passes through a bushing installed in a bore defined in the main housing 92, the bore connecting with the annular flow passage 98. The proximal (radially outer) end of the drive arm 110 is located outside the main housing 92 and is rigidly affixed to a link 130. An actuator 140 is provided for rotating the drive arm 110. The link 130 has a connecting member 132 that is offset from the rotation axis of the drive arm 110 and that is coupled to an actuator rod 142 of the actuator 140 such that extension of the actuator rod causes the link 130 to rotate the drive arm 110 in one direction and retraction of the actuator rod causes the link to rotate the drive arm 110 in the opposite direction. As a result, the drive arm 110 causes the valve member 104 to be rotated in one direction or the opposite direction about its axis.

With reference to FIG. 4A, the housing member 40 of the engine cylinder head 20 defines an integral wastegate passage 48 arranged to be in communication with the annular wastegate passage 98 (FIG. 5) of the wastegate unit 90. When the wastegate unit 90 is closed, exhaust gas is substantially prevented from flowing through the wastegate passage 48 and the wastegate passage 98, such that exhaust gas from the exhaust gas manifold is directed into the turbine wheel 60. When the wastegate unit 90 is partially or fully open, some or most of the exhaust gas bypasses the turbine wheel.

Thus, the turbocharger cartridge, bypass, and engine cylinder head assembly 10 has the following major components: the CHRA 32, the compressor contour plug 80, the wastegate unit 90, and the cylinder head 20 with its integral housing member 40. Viewed from the standpoint of the turbocharger supplier, there are only three main components or modules: the CHRA 32, the compressor contour plug 80, and the wastegate unit 90. Integration of certain features into the engine cylinder head as described above thereby allows a substantial simplification of the turbocharger components to be supplied to the engine manufacturer or assembler.

Figure 8:
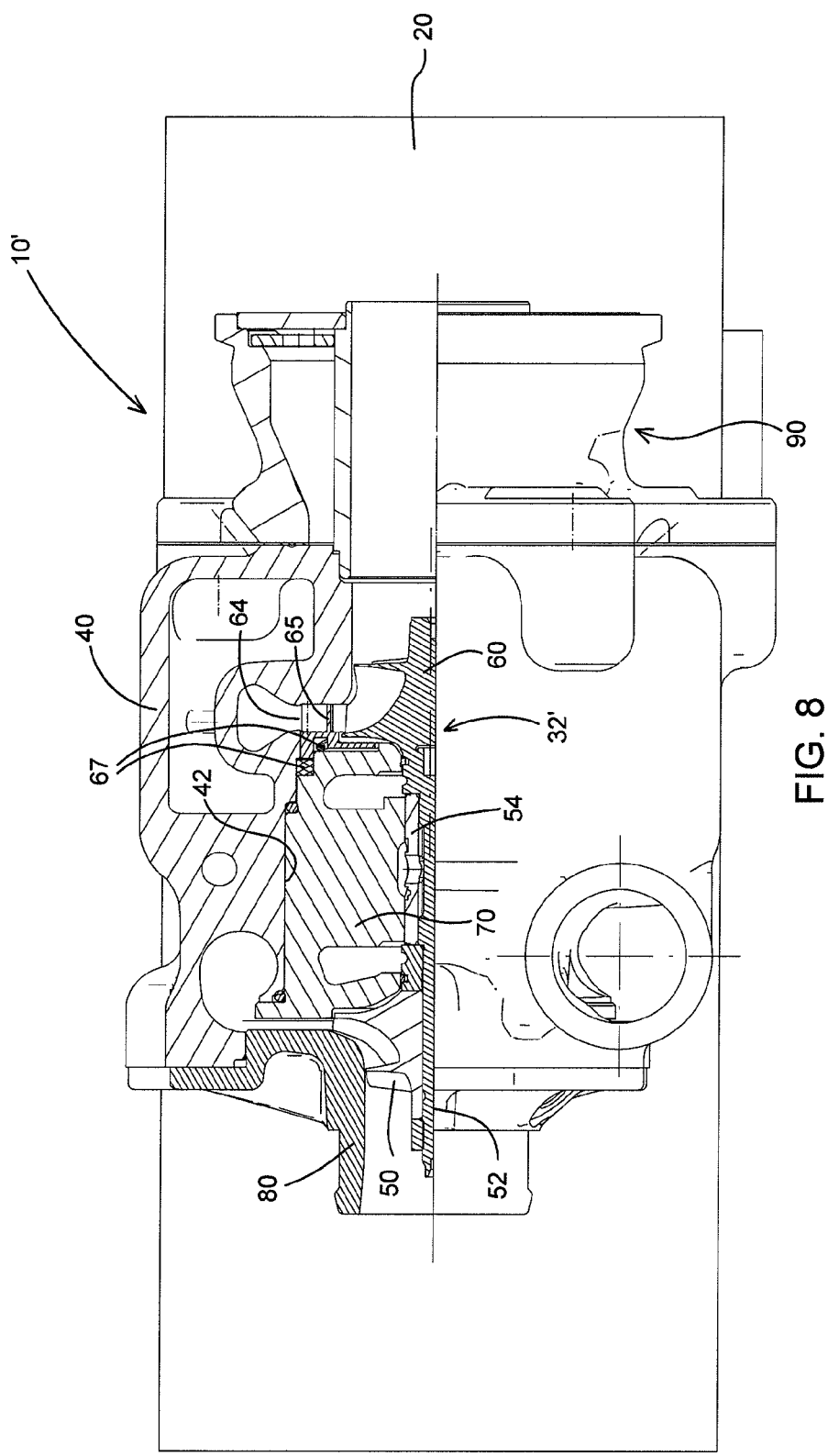
FIG. 8 is a view similar to FIG. 5, showing an alternative embodiment of the invention.
Figure 9:
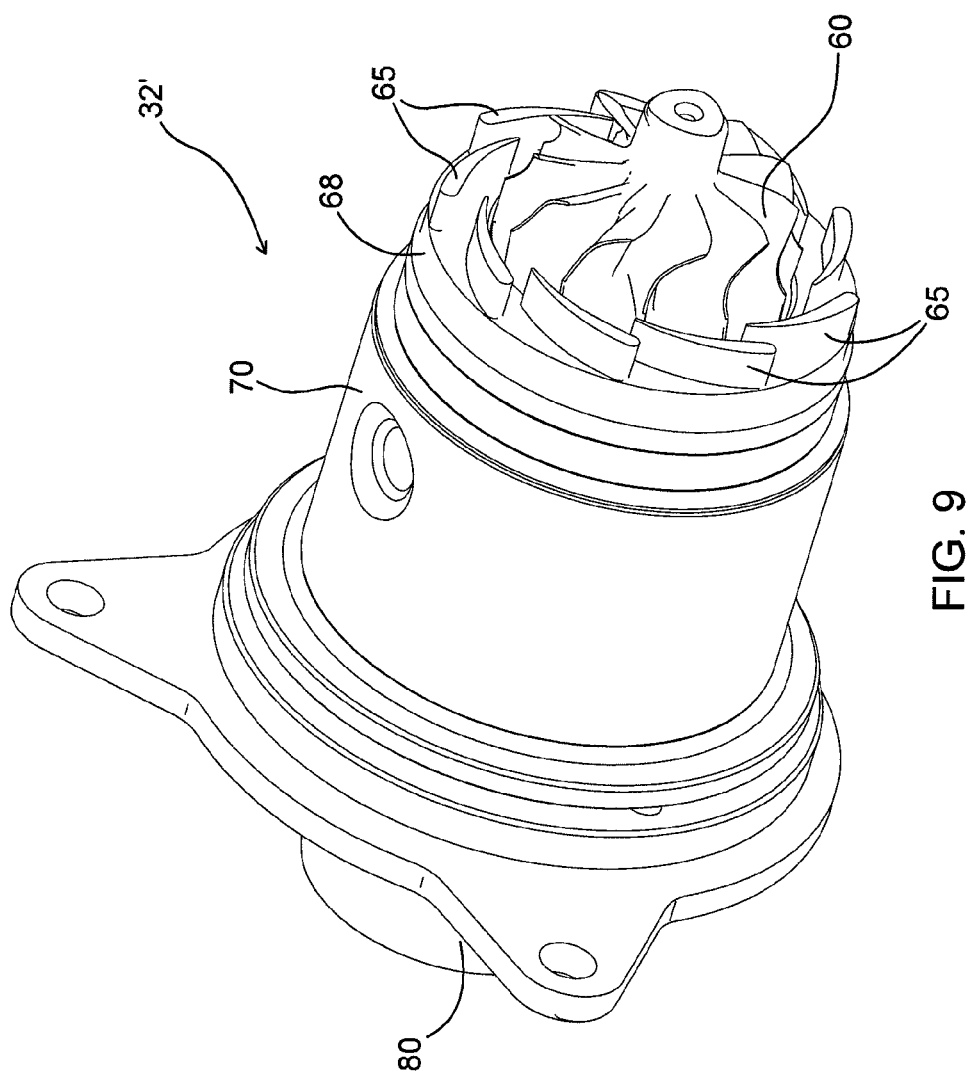
FIG. 9 is perspective view of the turbocharger cartridge used in the embodiment of FIG. 8, as viewed generally from the turbine side.
Figure 10:
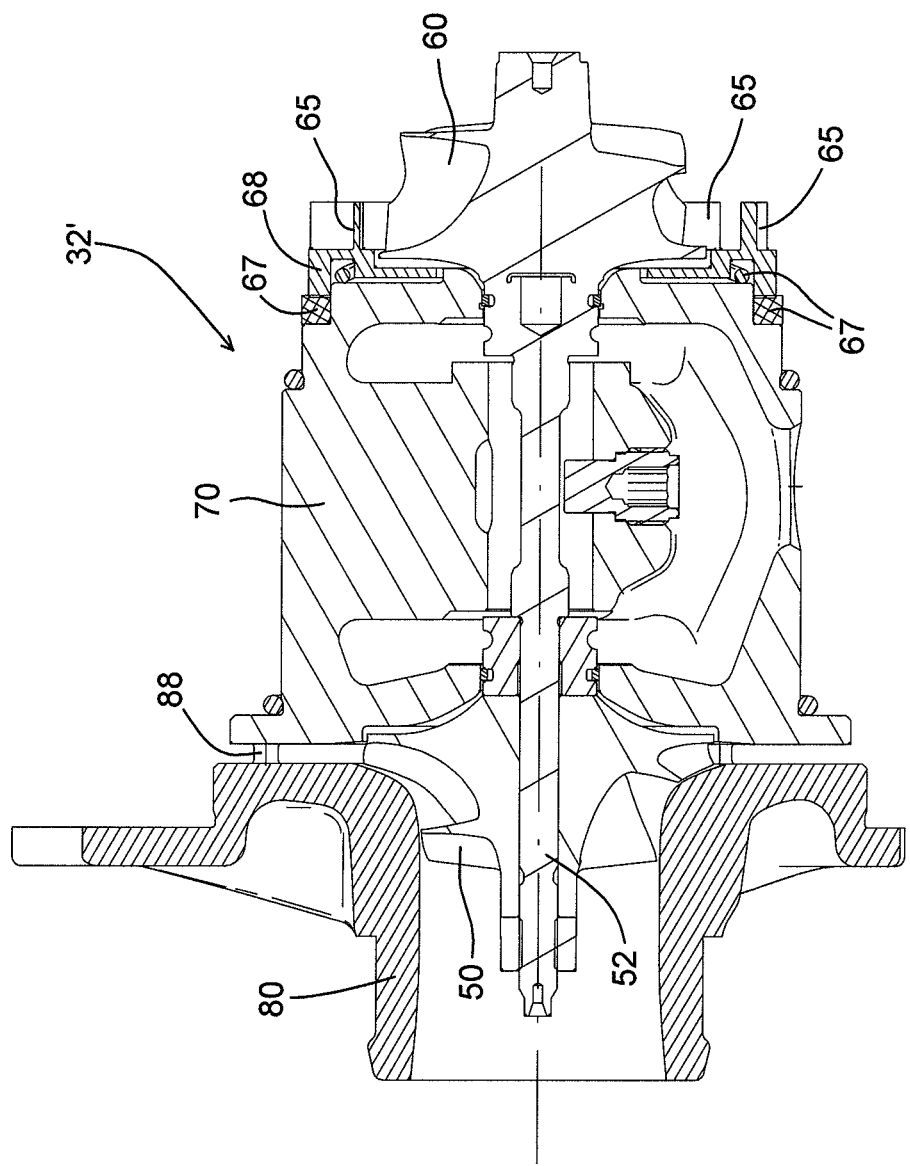
FIG. 10 is a cross-sectional view of the turbocharger cartridge of FIG. 9.
Figure 11:
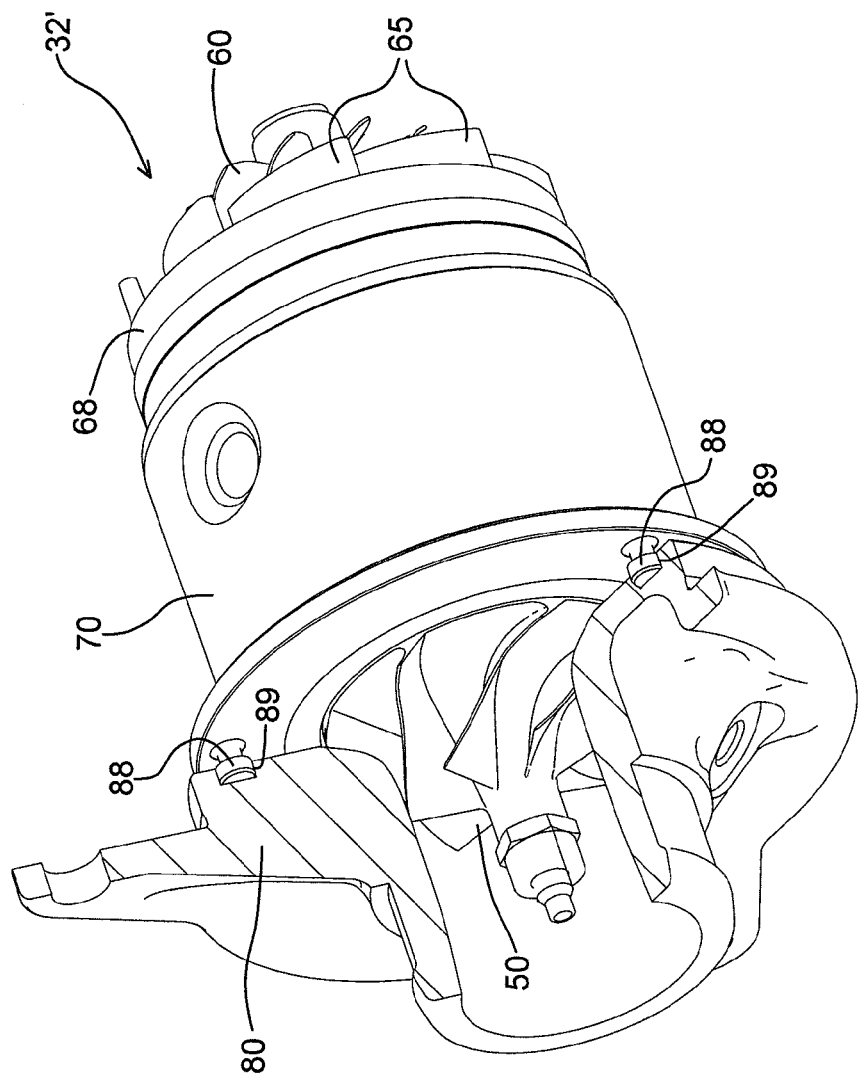
FIG. 11 is a perspective view of the turbocharger cartridge of FIG. 9, as viewed generally from the compressor side, and partly in section.

FIGS. 8 through 11 illustrate a further embodiment of the invention. The turbocharger cartridge, bypass, and engine cylinder head assembly 10' depicted in FIG. 8 is generally similar to the assembly 10 described above, but differs in that the CHRA 32' is configured to define vanes 65 for the turbine nozzle 64. The vanes 65 are supported on a generally annular member 68 that serves as a heat shield for the center housing 70. The free ends of the vanes 65 abut the opposite wall of the nozzle 64 formed by the housing member 40 when the CHRA is inserted into the receptacle 42, and sealing members 67 are compressed between the heat shield 68 and the center housing 70. There are a plurality of spacers 88 connected between a wall of the compressor contour plug 80 and an opposing wall of the center housing 70. The spacers 88 ensure that there is the proper spacing between the plug wall and the opposite wall of the center housing, to achieve the desired dimension for the diffuser 44. The spacers 88 are received in blind holes 89 defined in the wall of the plug 80 and in corresponding holes defined in the center housing. The spacers can be press-fit into these holes.

Many modifications and other embodiments of the inventions set forth herein will come to mind to one skilled in the art to which these inventions pertain having the benefit of the teachings presented in the foregoing descriptions and the associated drawings. For example, while it is advantageous to include the wastegate unit in the assembly as described above, the partial integration of the turbocharger in the engine cylinder head in accordance with the invention has utility and advantages in applications lacking such a wastegate unit. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger cartridge and engine cylinder head assembly, comprising:
   a center housing rotating assembly comprising a center housing, bearings housed in the center housing, a shaft rotatably supported in the bearings, and compressor and turbine wheels affixed to opposite ends of the shaft;
   an engine cylinder head and a housing member formed together as a one-piece integral structure, wherein the housing member defines at least a compressor volute that receives compressed air from the compressor wheel, a turbine volute for receiving exhaust gas from the engine, a turbine nozzle for directing exhaust gas from the turbine volute into the turbine wheel, and a turbine contour; and
   a compressor contour plug that defines an axial inlet for the compressor and a compressor contour, wherein the compressor contour plug is separately formed from the center housing and the engine cylinder head;
   wherein the housing member defines a receptacle for receiving the center housing rotating assembly, and the receptacle and the center housing rotating assembly are configured such that the center housing rotating assembly slides axially, turbine wheel first, into the receptacle, the compressor contour plug then being affixed to the housing member of the engine cylinder head.

2. The turbocharger cartridge and engine cylinder head assembly of claim 1, further comprising seals between the center housing rotating assembly and the housing member of the engine cylinder head, the seals being compressed to seal interfaces between the center housing rotating assembly and the housing member.

3. The turbocharger cartridge and engine cylinder head assembly of claim 1, wherein the turbocharger cartridge defines vanes for the turbine nozzle.

4. The turbocharger cartridge and engine cylinder head assembly of claim 3, wherein the vanes are supported on a heat shield engaged with the center housing.

5. The turbocharger cartridge and engine cylinder head assembly of claim 1, further comprising a plurality of spacers connected between the compressor contour plug and the center housing for maintaining a desired spacing between a wall of the compressor contour plug and an opposing wall of the center housing, wherein said walls define a diffuser for leading the compressed air into the compressor volute.

6. A turbocharger cartridge, bypass, and engine cylinder head assembly, comprising:
   a center housing rotating assembly comprising a center housing, bearings housed in the center housing, a shaft rotatably supported in the bearings, and compressor and turbine wheels affixed to opposite ends of the shaft;
   an engine cylinder head and a housing member formed together as a one-piece integral structure, wherein the housing member defines at least a compressor volute that receives compressed air from the compressor wheel, a turbine volute for receiving exhaust gas from the engine, a turbine nozzle for directing exhaust gas from the turbine volute into the turbine wheel, and a turbine contour;
   a compressor contour plug that defines an axial inlet for the compressor and a compressor contour, wherein the compressor contour plug is separately formed from the center housing and the engine cylinder head;
   wherein the housing member defines a receptacle for receiving the center housing rotating assembly, and the receptacle and the center housing rotating assembly are configured such that the center housing rotating assembly slides axially, turbine wheel first, into the receptacle, the compressor contour plug then being affixed to the housing member of the engine cylinder head; and
   a wastegate unit operable for allowing exhaust gas to bypass the turbine wheel when the wastegate unit is open and preventing exhaust gas from bypassing the turbine wheel when the wastegate unit is closed, the wastegate unit being affixed to the housing member adjacent the turbine wheel.

7. The turbocharger cartridge, bypass, and engine cylinder head assembly of claim 6, wherein the housing member of the engine cylinder head defines a wastegate passage and the wastegate unit defines a corresponding wastegate passage, and the wastegate passage of the housing member mates with the wastegate passage of the wastegate unit.

8. The turbocharger cartridge, bypass, and engine cylinder head assembly of claim 6, wherein the wastegate unit comprises a rotary bypass valve.

9. The turbocharger cartridge, bypass, and engine cylinder head assembly of claim 6, further comprising seals between the center housing rotating assembly and the housing member of the engine cylinder head, the seals being compressed to seal interfaces between the center housing rotating assembly and the housing member.

10. The turbocharger cartridge, bypass, and engine cylinder head assembly of claim 6, wherein the turbocharger cartridge defines vanes for the turbine nozzle.

11. The turbocharger cartridge, bypass, and engine cylinder head assembly of claim 10, wherein the vanes are supported on a heat shield engaged with the center housing.

* * * * *